Patented Aug. 11, 1942

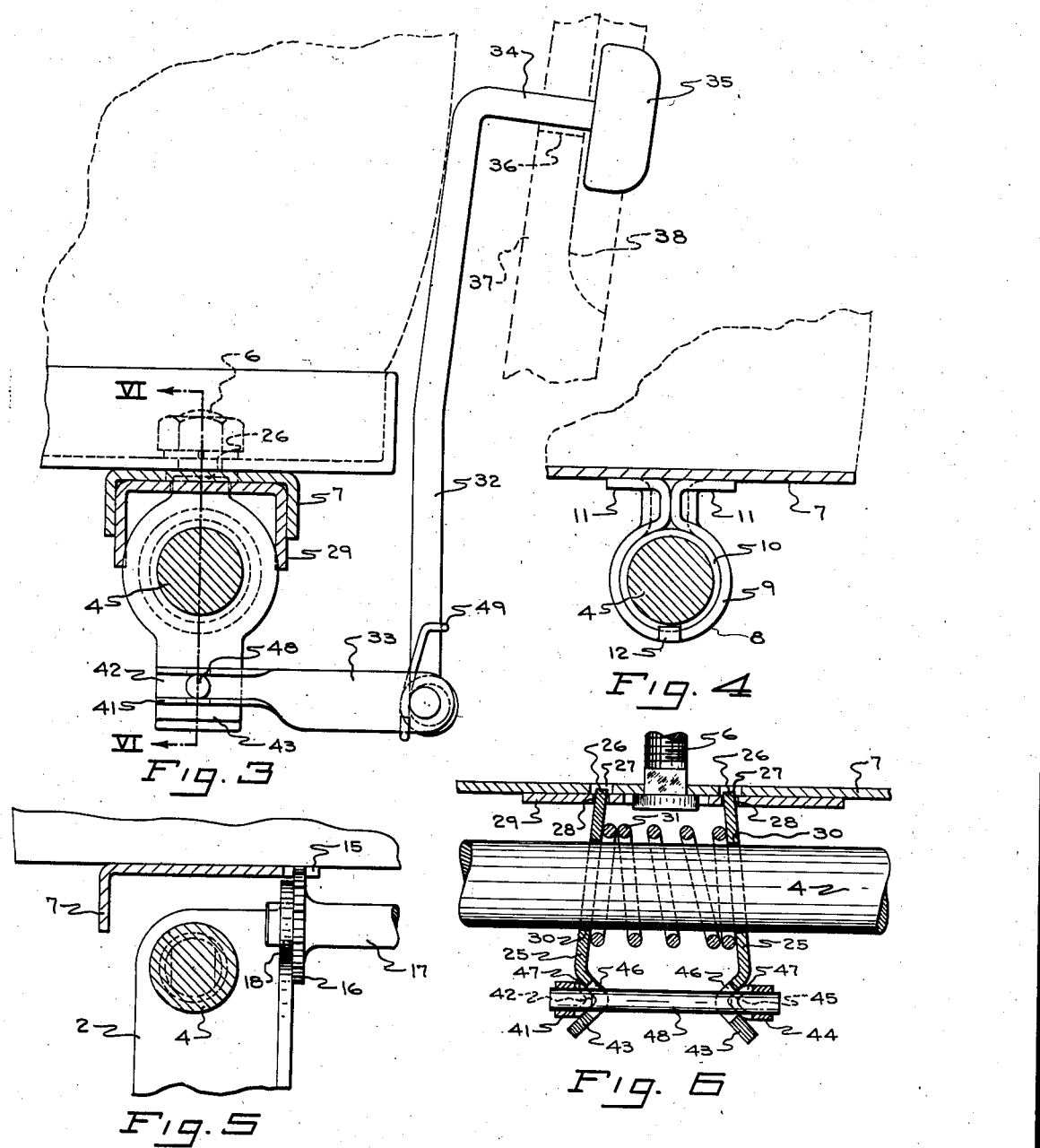

2,292,718

UNITED STATES PATENT OFFICE 2,292,718

SEAT ADJUSTMENT STRUCTURE

Creighton W. Ryerson, Jackson, Mich., assignor to Ryerson & Haynes, Inc., Jackson, Mich., a corporation of Michigan Application May 15, 1939, Serial No. 273,594

6 Claims. (Cl. 155—14)

This invention relates to supports for seats particularly designed for automotive vehicles and more particularly to structure for adjusting a seat forwardly and rearwardly with respect to the base on which it is supported.

Numerous seat supports and adjustment structures have been designed, but these are characterized by a large number of moving parts, by inefficient locking devices, or by excessive cost of manufacture. The present invention overcomes the foregoing disadvantages by providing a supporting and adjusting structure which is simple in construction and inexpensive to manufacture.

According to the present invention a seat supporting carriage is slidably mounted on a pair of spaced parallel track members which are in turn supported on a suitable base. The carriage is adjusted by sliding it along the track members and is locked in adjusted position by a frictional clutch structure secured to the carriage and operable to lock the same to one of the track members. A lever, conveniently located so as to be readily accessible by a person sitting in the seat to be adjusted, is operatively connected to the clutch for the purpose of actuating the same.

An object of the present invention is to provide a friction clutch for locking an adjustable seat in adjusted position.

Another object of the invention is to provide a seat adjustment structure which is locked in adjusted position by plate clutch members.

A further object of the invention is to provide a control mechanism which includes camming structure for releasing a friction clutch.

A still further object of the invention is to provide a novel structure for supporting a seat carriage for sliding movement on tracks or ways.

A still further object of the invention resides in a combination arrangement and construction of the parts in a seat adjustment structure.

Figure 1:
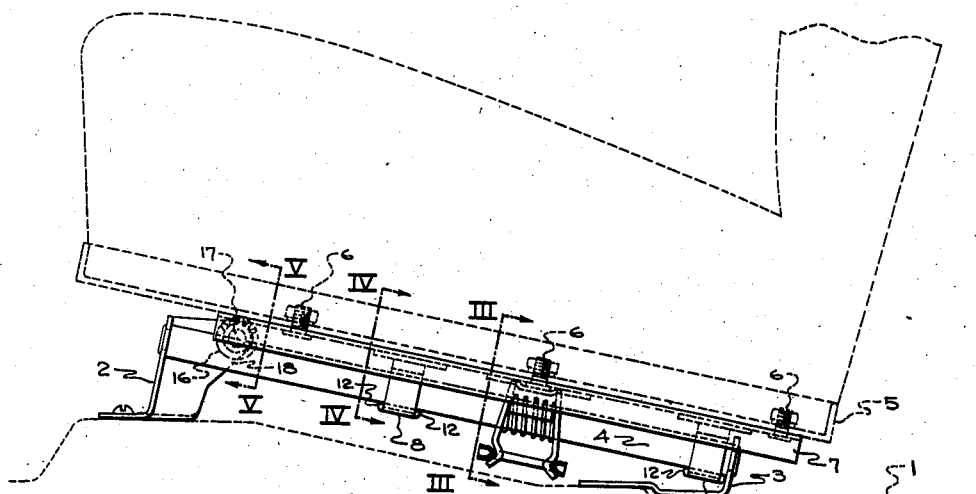
Figure 2:
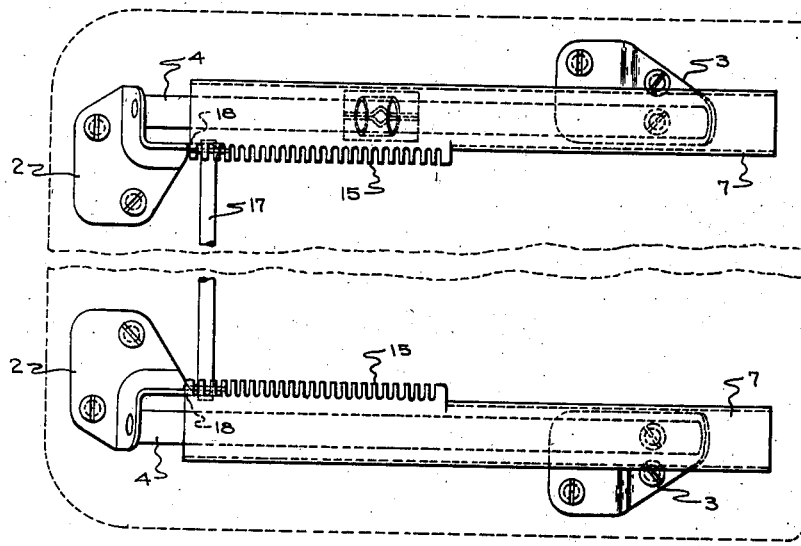

These and other objects will be apparent from the following specification when taken with the accompanying drawings, in which Fig. 1 is a side elevation of a seat adjustment structure according to the present invention, Fig. 2 is a plan view thereof, Fig. 3 is a section on the line III—III of Fig. 1, Fig. 4 is a partial section on the line IV—IV of Fig. 1, Fig. 5 is a section on the line V—V of Fig. 1, and Fig. 6 is a section on the line VI—VI of Fig. 3.

Referring particularly to the drawings, the reference character 1 indicates a base comprising the floor of an automotive vehicle or the like, although it will be understood that the present seat structure may have other applications than for use in automotive vehicles. Supported from the base 1 through brackets 2 and 3, are track or way members 4, in the form of cylindrical rods. As shown particularly in Figs. 1 and 2 of the drawings, the brackets 2 are at the front of the construction and the brackets 3 are at the rear thereof. It will also be clear from Figs. 1 and 2 of the drawings, that the tracks 4 are inclined to the horizontal.

The seat structure 5 generally indicated in dotted lines is secured by bolts 6 to a carriage 7, the carriage 7 being supported by means of brackets 8 for slidable movement on the tracks 4. The brackets 8 are shown particularly in Figs. 1, 2 and 4 of the drawings and comprise a sheet metal jacket 9 supporting a suitable bearing metal sleeve 10. The jacket 9 is provided with flanges 11 suitably secured to the carriage 7 and the sleeves 10 are secured in the brackets 9 by tabs 12, bent up from the bracket 9 into engaging and restraining relation with the sleeve 10.

There are two carriages 7, one for association with each track 4. In order to insure that the carriage members 7 move together, that is, to avoid racking, they are tied together for simultaneous movement by rack and pinion structure disclosed particularly in Figs. 2 and 5. The carriage members 7 are in the form of channel shaped sheet metal structures having side flanges. As shown in Fig. 2 on adjacent sides of the carriage members 7, a portion of the respective side flanges are bent up into the plane of the web portions of the channel shaped carriages 7 and have formed in them gear teeth 15 preferably by stamping. Each set of gear teeth 15 has associated with it a pinion 16 shown particularly in Fig. 5. The pinions 16 are supported on a common shaft 17 journalled in tabs 18 comprising integral portions of the brackets 2, which project rearwardly as shown particularly in Fig. 1. Thus, when one of the carriages 7 moves forwardly or rearwardly a similar motion must be taken by the other of the carriages 7 regardless of the tying action of the seat structure 5 connected to them.

The mechanism for locking the seat structure 5 in any adjusted position to the tracks 4 is shown best in Figs. 1, 3 and 6. The mechanism consists of a friction clutch associated with one of the tracks 4, preferably the one on the left side of the seat so that it will be readily accessible to the driver when the seat is used in an automotive vehicle. The clutching structure consists of two plate clutch members 25 having at the upper ends thereof integral tabs 26. The tabs 26 are disposed in openings 27 in the carriage 7 with which the clutch structure is associated and openings 28 in the plates 29 secured to the carriage 7 adjacent the clutch structure for the purpose of reinforcing the same. Each plate clutch member 25 is provided with a generally circular opening 30 through which is passed the associated track 4. As shown particularly in Figs. 3 and 6 each opening 30 is of slightly greater diameter than the track 4 so as to permit pivotal movement of the plate clutch member 25 with respect to the carriage 7. A helical spring 31 is disposed around the track 4 and between the plate clutch members 25 so as to resiliently urge the plate clutch members 25 apart pivoting them about the openings 27 and 28 in the carriage 7 and plate 29 respectively. When the plate clutch members 25 are pivoted apart by the spring 31 in the manner shown particularly in Figs. 1 and 6, the edges of the openings 30 therein bite into the track 4 in such a manner as to lock the carriage 7 with respect to the track 4. In order to unlock the two parts it is necessary to move the plate clutch members 25 into substantially normal relation with the track 4.

The unlocking or unclutching mechanism for moving the plate clutch members 25 relatively together consists of a lever 32 pivoted to an arm 33. The lever 32 has the upper end 34 thereof bent to project laterally and is provided with a hand knob 35. The upper end 34 projects through a slot 36 in the side frame member 37 of the receptacle for the cushion spring structure of the seat construction. The side frame member 37 is shown in dotted outline in Fig. 3. As shown particularly in Fig. 3 the slot 36 is elongated to permit vertical movement of the lever 32 and its upper end portion 34, and the side wall member 37 is provided with a recess 38 for receiving the knob 35.

The outer end of the arm 33 is formed into a channel shaped portion 41 having a wedge shaped web portion 42. The wedge shaped web portion 42 is normally disposed in engagement with a complementary wedge shaped portion 43 disposed adjacent the free end of one of the plate clutch members 25, as shown in Figs. 1 and 6. The other plate member 25 is also provided with a wedge shaped portion 43 and it has associated with it, a channel shaped member 44 having a wedge shaped web portion 45. As shown particularly in Figs. 1 and 6, the wedge shaped portions 43 face outwardly and are provided midway between their ends with openings 46. The channel shaped members 41 and 44 are provided with openings 47 substantially midway between their lengths. A rod 48 extends through the openings 46 in the wedge shaped portions 43 of the plate clutch members 25 and through the openings 47 in the channel shaped portions 41 and 44. The rod 48 is suitably connected as by welding to the channel shaped members 41 and 44.

The channel shaped members 41 and 44 act as cams while the wedge shaped members 43 act as followers. Accordingly, when the lever 32 is lifted upwardly by grasping the knob 35 the arm 33 rocks the wedge shaped member 41 about the axis of the rod 48, and through the rod 48 rocks the wedge shaped member 44. The wedge shaped members 41 and 44 should be spaced apart a distance to maintain them in snug engagement with the wedge shaped members 43 when the plate clutch members 25 are urged apart into clutching relation with the track members 4 by the spring 31. Then when the members 41 and 44 are rocked as described, the wedge shaped web portions thereof cam the plate clutch members 25 together against the action of the spring 31 to unclutch the plate clutch members 25 from the track 4.

As shown particularly in Fig. 3, a spring 49 is associated with the lever 32 and the arm 33 in such a manner as to normally urge the knob 35 of the lever 32 against the frame member 37. Thus when the lever 32 is raised, the angle formed between the lever 32 and the arm 33 tends to straighten out against the action of the spring 49. Due to the fact that the rotative movement of the channel shaped members 41 and 44 about the axis of the rod 48 is limited by the length of the slot 36 in the side frame members 37, the resiliency of the spring 31 acting against the plate clutch members 35 will tend, through the followers 43, to cam the channel shaped members 41 and 44 back into the position shown in the drawings. The return of the lever 32 to the position in the drawings is also assisted by the action of the spring 49.

In operation of the present invention when applied to the front seat of an automotive vehicle for instance, it is merely necessary for the driver of the vehicle to reach to the side of his seat with his left hand and grasp the knob 35. Then by raising the knob 35, the plate clutch members 35 are moved inwardly to unclutch them from the track member 44 and the position of the seat structure may be adjusted by urging the same forwardly or rearwardly as desired. The seat structure is then locked in its adjusted position by releasing the knob 35. Upon this action the spring 31 urges the plate members 25 apart to clutch them to the track 4 in the manner above described.

While the invention has been described as applied to adjusting a seat construction, it will be evident that it may have other applications. Furthermore, it will be evident that the mechanism for releasing the plate clutch members 25 may have other applications. Accordingly, what I desire to secure by Letters Patent and claim is:

1. A friction clutch for seat adjustment structure and the like comprising a bar-like member, a pair of plate clutch members having aligned openings therein receiving said bar-like member, means for pivotally supporting adjacent ends of said plate clutch members, means to resiliently pivot said plate clutch members apart to move the edges of said openings into clutching relation with said bar-like members, said plate clutch members having therein adjacent the free ends thereof integral oppositely facing depressions having inclined sides comprising cam followers, camming means supported in each of said depressions, and means for pivoting said camming means about a common axis to bear against said inclined sides to pivot said plates toward normal relation with said bar-like member to unclutch said plate clutch members from said bar-like member.

2. A friction clutch for seat adjustment structure and the like comprising a bar-like member, a pair of plate clutch members having aligned openings therein receiving said bar-like member, means for pivotally supporting adjacent ends of said plate clutch members, means to resiliently pivot said plate clutch members apart to move the edges of said openings into clutching relation with said bar-like member, said plate clutch members having therein adjacent the free ends thereof integral oppositely facing depressions having inclined sides comprising cam followers, camming means supported in each of said depressions, an elongated member rigidly connecting said camming means, and a lever connected to said camming means for jointly swinging said camming means about the longitudinal axis of said elongated member whereby actuation of said lever actuates said camming means to bear against said inclined sides to cam said plate clutch members toward normal relation with said bar-like member to unclutch said plate clutch members from said bar-like member.

3. In structure for adjusting a seat with respect to a base, a seat carriage, a bar-like member extending axially of the direction of adjusting movement of the seat, a plate clutch member having an opening therein for receiving said bar-like member, means for moving said plate clutch member into angular relation with said bar-like member to move the edges of said opening into clutching relation with said bar-like member, a follower comprising an inclined surface on said plate clutch member, a cam mounted for operative association with said follower for camming said plate clutch member out of clutching relation with said bar-like member, said cam having a rigid extension, an arm pivoted to said extension for moving said cam in camming relation against said follower, means operatively associated with said extension and said arm to maintain said arm in operative position, means to support one of said members from said base, and means to support the other of said members from said carriage, whereby when said members are locked together said carriage is locked with respect to the base.

4. In a carriage and track structure, a carriage, a track comprising a bar-like member supported from adjacent the ends thereof, a sleeve telescopically related to said bar-like member, a bracket substantially surrounding said sleeve and connected to said carriage, and tabs on said bracket maintaining said sleeve and bracket against relative axial movement to maintain the two parts in assembled relation, said sleeve and bracket structure providing a slidable connection between said track and said carriage.

5. A friction clutch for seat adjustment structure and the like comprising a bar-like member, a pair of plate clutch members having aligned openings therein receiving said bar-like member, means for pivotally supporting adjacent ends of said plate clutch members, means to resiliently pivot said plate clutch members apart to move the edges of said openings into clutching relation with said bar-like member, said plate clutch members having adjacent the free ends thereof integral oppositely facing depressions having inclined sides comprising cam followers, camming means supported in each of said depressions, a pin projecting through said plate clutch members and into connecting engagement with each of said camming means for coordinating the movement of said camming means, and means for oscillating said camming means about the axis of said pin to bear against said inclined sides for actuating said plate clutch members out of clutching relation with said bar-like member.

6. A friction clutch for seat adjustment structure and the like comprising a bar-like member extending axially of the direction of adjusting movement of the seat, a plate clutch member having an opening therein for receiving said bar-like member, means for pivotally supporting one end of said plate clutch member, means to resiliently pivot said plate clutch member to move the edges of said opening into clutching relation with said bar-like member, said plate clutch member having therein adjacent the free end thereof an integral depression having an inclined side comprising a cam follower, an elongated cam supported in said depression for pivotal movement about an axis normal to its longitudinal axis, and means to pivot said cam about said normal axis to cause said cam to bear against said inclined surface to cam said plate clutch member toward normal relation with said bar-like member to unclutch said plate clutch member from said bar-like member.

CREIGHTON W. RYERSON.